United States Patent [19]

Sackoff et al.

[11] 4,151,319

[45] Apr. 24, 1979

[54] METHOD FOR MAKING A PRESSURE SENSITIVE ADHESIVE COATED LAMINATE

[75] Inventors: Martin M. Sackoff, Glens Falls; John R. Smith, Gansevoort, both of N.Y.; Billy E. Walling, Martinez, Ga.

[73] Assignee: United Merchants and Manufacturers, Inc., New York, N.Y.

[21] Appl. No.: 868,750

[22] Filed: Jan. 12, 1978

Related U.S. Application Data

[63] Continuation of Ser. No. 690,152, May 26, 1976, abandoned.

[51] Int. Cl.² .............................................. B32B 7/06
[52] U.S. Cl. .................................... 428/40; 156/249; 156/289; 156/264; 156/327; 156/269; 260/824 R; 427/207 B; 428/352; 428/355; 428/354; 428/906
[58] Field of Search ............... 156/329, 249, 71, 264, 156/152, 269, 184, 278, 192, 289, 238, 322, 246, 324, 247, 327; 427/207 B, 387, 407 R; 260/824 R, 448.2 B; 428/40, 355, 343, 447, 352, 906, 354

[56] References Cited

U.S. PATENT DOCUMENTS

| | | | |
|---|---|---|---|
| 2,248,318 | 7/1941 | Van Cleet | 156/264 |
| 2,790,732 | 4/1957 | McGarry et al. | 428/355 |
| 2,862,613 | 12/1958 | Klemka et al. | 428/40 |
| 2,878,142 | 3/1959 | Bohaty | 427/207 D |
| 2,878,195 | 3/1959 | Hurd | 260/824 R |
| 2,999,835 | 9/1961 | Goldberg | 428/447 |
| 3,006,463 | 10/1961 | Bond | 428/40 |
| 3,212,957 | 10/1965 | Lind et al. | 156/71 |
| 3,220,879 | 11/1965 | Stare et al. | 428/447 |
| 3,555,063 | 1/1971 | Nakajima et al. | 260/824 R |
| 3,788,941 | 1/1974 | Kupits | 156/289 |

*Primary Examiner*—John T. Goolkacian
*Assistant Examiner*—J. J. Gallagher
*Attorney, Agent, or Firm*—Michael A. Caputo

[57] ABSTRACT

A method for making a pressure sensitive adhesive coated laminate is disclosed. The method involves coating a sheet having a release surface thereon with a pressure sensitive adhesive to form a laminate, drying or curing the pressure sensitive adhesive and marrying the laminate to the inner surface of a facing layer. A material which produces a low zero-minute peel value in the pressure sensitive adhesive layer is intimately mixed with the pressure sensitive adhesive prior to the adhesive being coated on the release surface of the sheet. The resulting laminate can be easily applied to a substrate and removed and repositioned or straightened, if necessary, and provides an increase in peel value over a period of time to produce a more permanent installation. The laminate is suitable for use as decorative and-/or protective covering as well as adhesive tapes, labels, and the like.

81 Claims, 7 Drawing Figures

METHOD FOR MAKING A PRESSURE SENSITIVE ADHESIVE COATED LAMINATE

RELATED APPLICATION

This application is a continuation of application Ser. No. 690,152, filed May 26, 1976, and now abandoned.

BACKGROUND OF THE INVENTION

1. Field of the Invention

This invention pertains to the field of laminates having a pressure sensitive adhesive layer. More particularly, this invention relates to the method of making pressure sensitive adhesive coated laminates for covering substrates for decorative and/or protective purposes or for adhesive tapes, labels, and the like.

2. Description of the Prior Art

The development of pressure sensitive adhesive systems has resulted in their use in a great variety of areas, such as, for tapes, decals, decorative and protective coverings in sheet form for walls, furniture, and the like, self-stick floor coverings, and generally, for any purpose wherein it is desired to adhere an article to a substrate.

Because of the increased movement towards the so-called "do-it-yourself" type of home improvements and decorating, many articles, such as, wall coverings, counter coverings, tile appliques, shelving covers and edgings, and the like, are now sold with pressure sensitive adhesive coatings thereon. Such pressure sensitive adhesive coatings facilitate the application of such articles to the desired substrate by eliminating the need to apply a separate adhesive or to utilize another type of securing device, such as nails, screws, staples, etc.

One of the problems with such pressure sensitive adhesive coated articles is that, in use, they are extremely difficult to position and, if necessary, reposition, even immediately after the application to the substrate. This problem is particularly severe with articles which are in the form of decorative and protective sheets coated with a pressure sensitive adhesive, and which are used to cover substrates, e.g., walls, cabinet tops, furniture, etc. Very often, such sheets or laminates possess decorative patterns on the outer face and it is important that the proper matching of the patterns from adjacent sheets be obtained. Moreover, it is often important that the seams between adjacent sheets be straight, uniform, and parallel.

Another problem which arises, particularly with larger pieces or sheets, such as, when one is attempting to cover a large piece of furniture or large wall area, is the difficulty in handling the sheet and the avoidance of touching of one area of the pressure sensitive adhesive coated side of the sheet with another area of the same side. When this occurs, the sheet will fold and the respective touching areas must be pulled apart. This can become extremely cumbersome, particularly with large sheets.

It also can result in removal of areas of the pressure sensitive adhesive coating when an attempt is made to pull the touching areas apart and cause discontinuities of the pressure sensitive adhesive coating as well as produce torn, stretched or wrinkled areas in the facing sheet which is usually made from paper or plastic sheeting or film.

Additionally, on application of the laminate to a substrate, folds, wrinkles, and bubbles often appear. These are relatively difficult to remove because of the aggressiveness of the pressure sensitive coated sheet for the substrate. This can be particularly troublesome when the facing layer is relatively thin, such as, for example, a thin film of vinyl.

U.S. patent application Ser. No. 568,988 filed Apr. 17, 1975, now abandoned disclosed a method of making a pressure sensitive adhesive coated laminate which overcomes many of the difficulties referred to above. The improvement therein disclosed involves the application between the pressure sensitive adhesive layer and the release surface of a means for decreasing the zero-minute peel value of the facing layer-pressure sensitive adhesive layer of the laminate. This means comprises a uniform and discontinuous layer of a coatable polysiloxane and, it is disclosed in said application, that the presence of such means at the surface of the pressure sensitive adhesive yields a product which overcomes many of the disadvantages and handling difficulties present in products of this type previously available.

SUMMARY OF THE INVENTION

Applicants have discovered an improved method for the production of pressure sensitive adhesive coated laminates wherein a first sheet having a release surface thereon is coated with a pressure sensitive adhesive to form a first laminate, and the first laminate is then subjected to conditions suitable to dry or cure the pressure sensitive adhesive, and the pressure sensitive adhesive side of the thus treated first laminate is married to the inner surface of a facing layer having inner and outer surfaces. The improvement involves the intimate mixing with the pressure sensitive adhesive prior to coating onto the release surface of a means for decreasing the "zero minute peel value" of the facing layer-pressure sensitive adhesive layer combination.

More particularly, by carefully selecting the material which is intimately mixed with the pressure sensitive adhesive a pressure sensitive adhesive coated laminate is obtained which is easily positioned and adhered to substrates and which can be removed, and, if necessary repositioned with ease during the application time.

Specifically, the material used to decrease the "zero minute peel value" is a polysiloxane and must be capable of being intimately mixed and dispersed throughout the pressure sensitive adhesive.

By virtue of the intimate mixing of the polysiloxane material with the pressure sensitive adhesive, the need for a separate and precisely controlled coating step wherein the polysiloxane is applied to the pressure sensitive adhesive is obviated. The number of process steps required during actual assembly of the pressure sensitive adhesive laminate is thus decreased without any sacrifice in the utility of the end product obtained.

The product produced according to the method of the present invention after removal from the release surface, i.e., when it is about to be applied to the substrate, possesses a relatively low peel value, i.e., a low degree of affinity for the substrate. As a consequence, if, when applied to the substrate, the particular sheet is not straight or in the desired position, it is easily removed for repositioning. Moreover, if two areas of the pressure sensitive adhesive coated side of the sheet should touch one another, they are easily pulled apart without disturbing the uniformity of the coating of the pressure sensitive adhesive or stretching or wrinkling of the facing layer.

Furthermore, any air bubbles or wrinkles which occur in the laminate on application to the substrate, may be easily removed by smoothing with hand pressure.

DESCRIPTION OF THE PREFERRED EMBODIMENT

Figure 1:
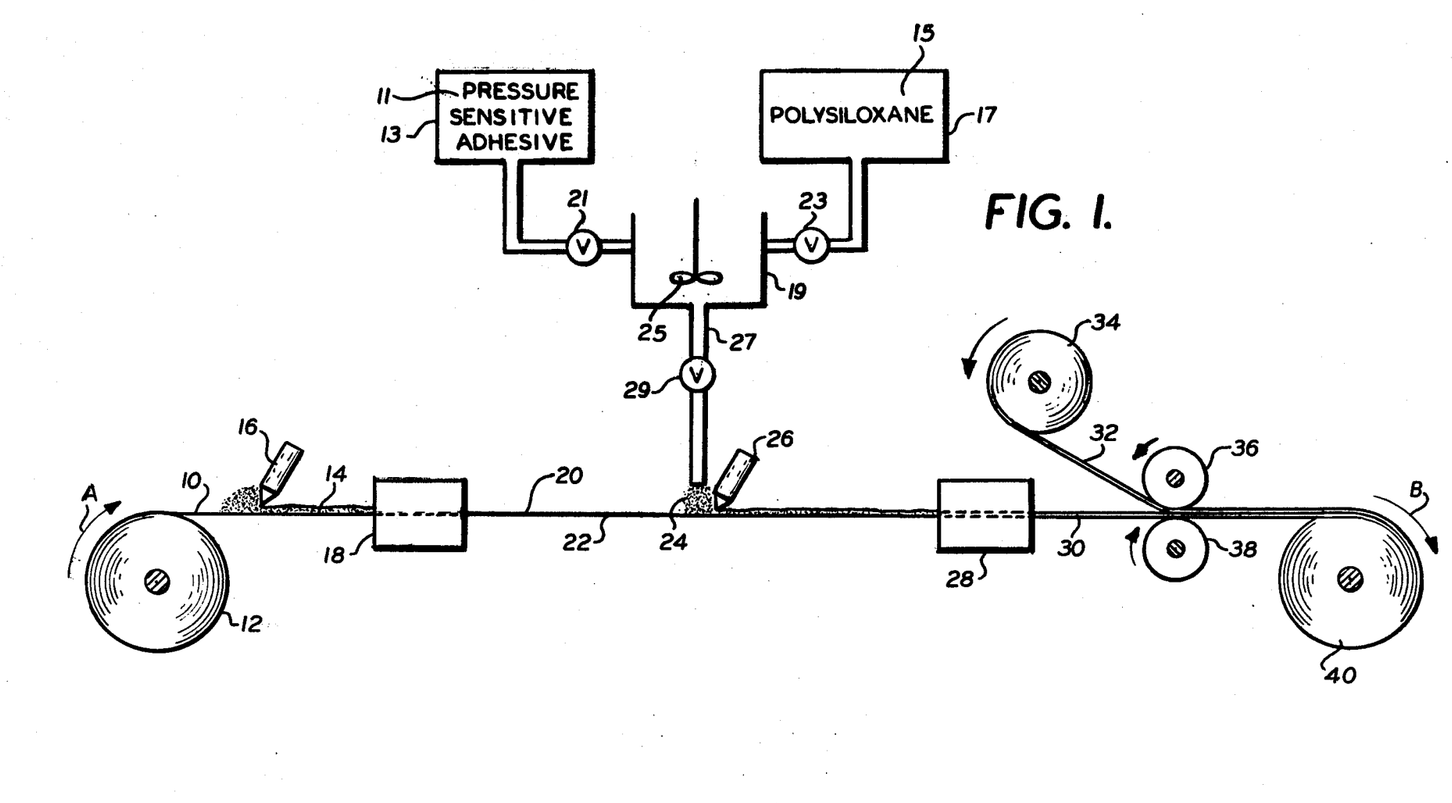
FIG. 1 is a schematic diagram of a process in accordance with the present invention.

Referring to the drawings, FIG. 1 shows a method for forming a laminate in accordance with the present invention comprising first coating a sheet of backing material 10, which suitably may be a kraft paper or other supportive sheet as defined hereinafter, from roll 12, which turns in the direction indicated by arrow A, with a suitable release material 14, such as, a silicone, or one of the other conventional materials used for this purpose.

The means for coating such material are well known, and as shown, a knife-coater 16 is utilized in the schematic. Thereafter, the coated sheet is passed through curing oven 18 which utilizes a conventional curing means, such as, heat, etc., to appropriately cure or set the release material. This produces a release surface 20 on release sheet 22. The release sheet 22 is coated with a modified pressure sensitive adhesive 24 using a knife-coater 26. The modification to the pressure sensitive adhesive involves incorporation of a polysiloxane into the adhesive in a manner which will be descrived in greater detail hereinafter.

Of course, various methods are known to the art for applying pressure sensitive adhesives and any of these conventional methods can be used to apply the modified pressure sensitive adhesive of the present invention. Typical methods in addition to knife-coating include, for example, spraying, roller coating, gravure roll coating, and the like.

In the embodiment of the invention shown in FIG. 1, pressure sensitive adhesive 11 from holding tank 13 and polysiloxane 15 from holding tank 17 are metered into mixing vat 19 by metering valves 21 and 23, respectively. In the mixing vat, stirrer 25 intimately blends the pressure sensitive adhesive and polysiloxane which is subsequently delivered to the coating blade of knife-coater 26 through supply line 27 and valve 29.

As will be described in greater detail hereinafter, it is also possible to pre-mix the pressure sensitive adhesive and polysiloxane at a place remote from the coating step of the present process and at a time prior to the coating.

After application of the modified pressure sensitive adhesive 24, the coated release sheet 22 is passed through oven 28 which utilizes conventional drying methods for pressure sensitive adhesive materials. Typically, temperatures in the range from about 190° to 280° F. for about 5 to 20 seconds are used. For pressure sensitive adhesives which are in a prepolymer form, a curing treatment is generally required. Such treatments are conventional in the art and may utilize heat and/or other means to effect curing.

Typically, the pressure sensitive adhesive layer 24 has a composition which will be as described hereinafter and generally has a thickness in the range from about 0.1 to 7 mils, and preferably from about 0.3 to 2 mils. Generally, it is coated in an amount, based on the dry solids weight, of from about 0.5 to 8.0 mg./cm$^2$.

Thereafter, the thus coated and cured sheet designated as 30 is married to an appropriate decorative or protective facing layer 32 unrolled from roll 34. The two layers are married by passing through nip rolls 36, 38 in a manner well known in the art. The pressure of nip rolls 36, 38 generally ranges from about 20–80 psi. Thereafter, the finished laminate is rolled onto roll 40 which revolves in the direction indicated by arrow B.

The overall thickness of the laminate is determined by the general end purpose for which it is to be used. Obviously, flexibility as well as weight would be factors which can be varied depending on this end purpose. Generally, however, in the sheet form of the present laminate intended for application by the consumer for general protective and decorating purposes the overall laminate thickness excluding the release layer is in the range from about 1 to 15 mils and preferably is from about 3.0 to 5.0 mils.

The foregoing described process is generally referred to in the art as an indirect type coating process. That is to say, it is a process for forming the laminate of the present invention wherein the pressure sensitive adhesive material is coated onto the release layer first, and the thus coated release layer is subsequently married to the facing layer. When, either in use or in subsequent processing, the release layer is peeled from the facing layer, the pressure sensitive adhesive coating remains with the facing layer. Thus, the layer which is to remain with the facing layer is indirectly coated thereon by first coating it onto the release surface and then transferring the layer by virtue of the peeling step.

The other type of coating process conventionally used in the art is known as the direct type process. This process will be described in detail with reference to FIG. 3, hereinafter. However, generally, it refers to the process wherein the pressure sensitive adhesive layer is coated directly onto the inner surface of the facing layer and then the release layer is married to the thus coated facing layer. The ultimate product obtained, is, of course, the same in either case.

Figure 2:
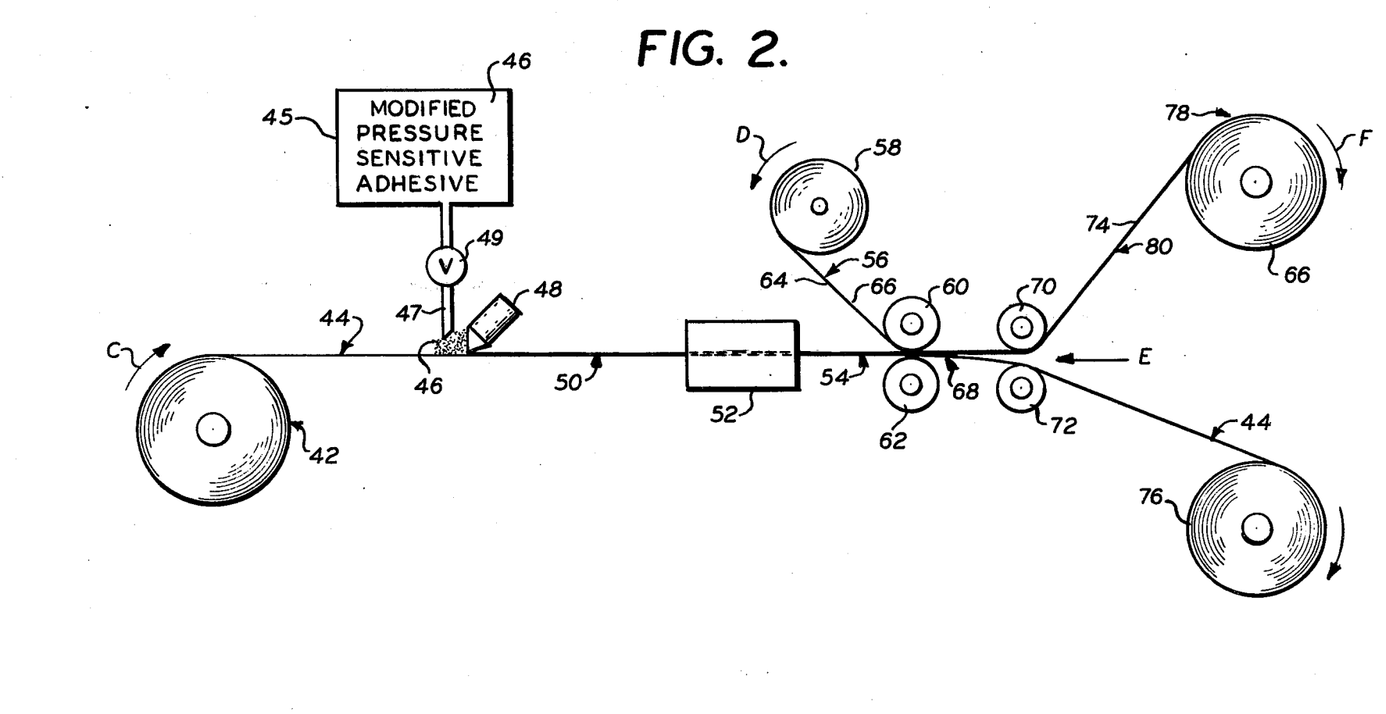
FIG. 2 is a drawing similar to FIG. 1 of another process in accordance with the present invention.

Referring now to FIG. 2, an indirect coating process is shown wherein the final laminate does not possess a separate release layer. Rather, the final laminate is generally in roll form and is composed of a facing layer hich possesses an outer surface and an inner surface, the outer surface being a release surface. A substantially continuous layer of a pressure sensitive adhesive material is adjacent to and contiguous with the inner surface of the facing layer and also the outer release surface of the facing layer.

In use, it is thus necessary only to unwind the facing layer from the roll whereupon it is ready for use since there is no separate release layer to peel. This form is particularly useful when the laminate is in the form of narrow tape and the like.

Such a roll may be formed utilizing the process depicted in FIG. 2 wherein roll 42 which is a roll of backing sheet as described hereinabove having a release surface 44 is unwound in the direction shown by arrow C. The release surface 44 of the backing material is coated with a polysiloxane modified pressure sensitive adhesive 46 using coating knife 48 to form a laminate 50. The pressure sensitive adhesive 46, which has earlier been modified by the incorporation of a polysiloxane, is supplied to coating knife 48 from holding tank 45 through supply line 47 and valve 49.

The laminate 50 is then passed through drying or curing oven 52. Thereafter, the dried laminate 54 is married to facing layer 56 which is unwound from roll 58 in the direction indicated by arrow D. The marrying operation is carried out by passing the combination of layers 54 and 56 through nip rolls 60, 62 to produce married laminate 68.

It is noted that facing layer 56 possesses an inner surface 64 and an outer surface 66. The outer surface possesses release properties. That is to say, outer surface 66 has been treated in such a manner so as to possess or is composed of a material which inherently possesses good release properties relative to the pressure sensitive adhesive material used.

Thereafter, married laminate 68 is passed through separator rolls 70, 72 whereupon the release sheet 44 is separated from the final laminate 74. At the separation point designated as E, the pressure sensitive adhesive layer remains with the inner surface 64 of facing layer 56 to form final laminate 74.

Release sheet 44 is wound onto roll 76 which may be reused. Final laminate 74 is wound onto roll 78 in a direction indicated by arrow F. Thus, by virtue of the winding operation, the final laminate 74 is rolled upon itself such that the adhesive coated surface 80 is immediately adjacent to and contiguous with the outer release surface 66 of the facing layer. As rolled, the laminate is now ready for cutting, packaging and use by the consumer or final user.

It is also noted that it is possible, in such an indirect coating process wherein the final laminate is produced in roll form without a separate release layer, for release sheet 44 to be disposed in the form of an endless belt which would avoid rewinding it onto roll 76.

Figure 3:
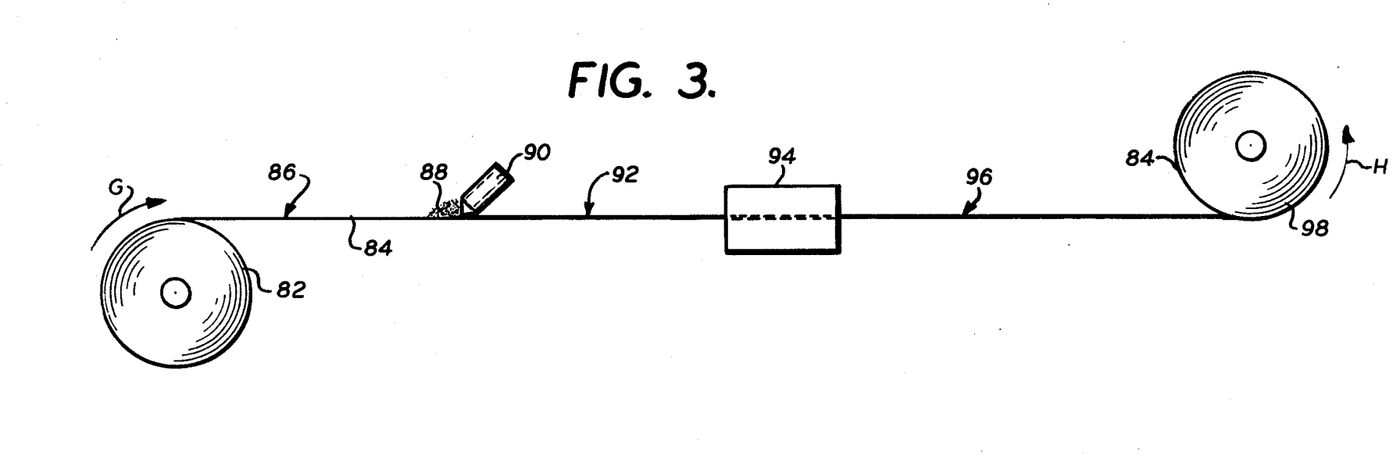
FIG. 3 is a drawing similar to FIG. 1 of yet another process in accordance with the present invention.

FIG. 3 illustrates yet another method by which the laminate of the present invention can be produced in roll form without the presence of a separate release sheet in the final roll. Particularly, FIG. 3 shows the direct method of coating referred to hereinabove. In this method, roll 82 of a facing layer having an outer surface 84 which possesses release properties and an inner surface 86 is unwound from roll 82 in the direction indicated by arrow G. The inner surface of facing layer 86 is coated with polysiloxane modified pressure sensitive adhesive material 88 using knife coater 90 to form a laminate 92. The laminate 92 is passed through drying oven 94 and the dried laminate 96 is rolled upon itself into roll 98 by winding in the direction indicated by arrow H. By vitue of winding in this direction, it is clear that the inner surface 86 of the facing layer which has thereon the coating of pressure sensitive adhesive is rolled such that the adhesive is adjacent to the outer release surface 84 of the laminate.

It is further clear that the process depicted in FIG. 3 could be carried out such that subsequent to exiting oven 94, laminate 96 may be married to a separate release sheet in the manner shown in FIG. 1 to form a final product having a separate release sheet.

In the case when the final product does not have a separate release sheet, it is possible to place it in stack form rather than in the form of a roll. Thus, referring to FIG. 3, after exiting oven 94, the laminate 96 may be cut into separate and equally sized pieces or sheets and the separate sheets can be stacked one upon the other such that the pressure sensitive adhesive layer of one sheet is immediately adjacent or next to the release surface of the facing layer of the next sheet in the stack. In use, therefore, it is only necessary to peel off the top sheet whereupon the next, uncovered sheet, presents itself for further use.

In the following discussion, reference will be made only to that embodiment of the present laminate wherein a separate release layer is present. It is clear, however, that the discussion also is applicable in all respects to those embodiments of the present laminate wherein a separate release layer is not present.

Figure 4:
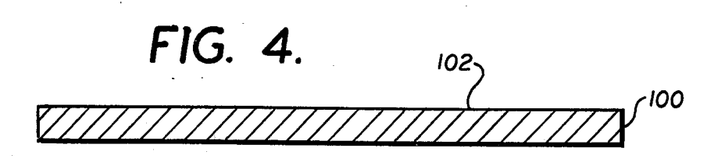
FIGS. 4, 5, 6 and 7 are sequential cross-sectional diagrams illustrating the formation of a laminate in accordance with the present invention.

Referring now to the figures which depict a laminate in accordance with the present invention, FIG. 4 shows a conventional backing layer 100 used for a pressure sensitive adhesive laminate. This material is generally referred to as a release sheet, although, in actuality, it may be fabricated from two separate components, namely a supporting sheet, such as, kraft paper or other material having sufficient dimensional stability to act as a supporting sheet, and a coating of a release material thereon as described hereinabove. Such sheets may also be impregnated with the release material.

The most well known and economical type release sheet used presently is an unbleached kraft paper directly coated on one or both sides with a cured silicone. It is possible however, to use other release materials, such as, glassine papers, spun bonded synthetic nonwovens, e.g., polyethylene, or continuous films of extruded synthetics, e.g., polyesters, polyethylene, polypropylene, cellophane, and the like, which possess release properties in the untreated state. Generally, however, the inherent release properties of such films are not sufficient and must be improved by coating with release compositions, such as, the cured silicones mentioned hereinabove.

Such release sheets or surfaces, and methods for their preparation are well known. Typically, the paper or backing sheet is dipped into a bath of a silicone release agent, or coated on one or both sides with the release agent, and then cured. Such methods are described in U.S. Pat. No. 2,503,782, incorporated herein by reference. Alternately, the release material may be knife or roller coated onto a sheet.

In any event, regardless what type release material is used, it is necessary only that the release surface 102 of the supporting or backing sheet 100 possess properties of good release with respect to pressure sensitive adhesive materials.

Alternately, the release surface can be the outer surface of the facing layer of the laminate such that the laminate is rolled upon itself as described hereinabove with reference to FIGS. 2 and 3. The release properties may be an inherent quality of the outer surface of the facing layer or a quality imparted through conventionally known finishing or coating techniques.

Figure 5:
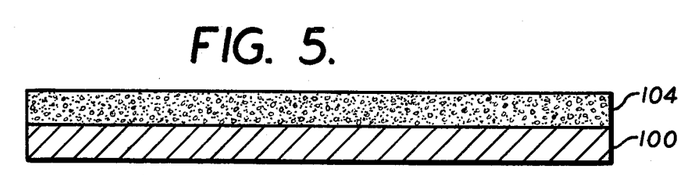

Referring now to FIG. 5, a layer of a modified pressure sensitive adhesive material 104 is coated on top of the backing sheet of FIG. 4 to form a laminate sometimes referred to hereinafter as a "first laminate". As stated hereinabove, the pressure sensitive adhesive has been modified by incorporation of a polysiloxane material therein and the coating of the modified pressure sensitive adhesive layer 104 may be accomplished by conventional methods, e.g., knife-coating, spraying, roller coating, gravure roll, and the like.

The pressure sensitive adhesive 104 may be one from a well known class of adhesive materials generally available in the art modified in the manner which will be described hereinafter. Typically, such a conventional adhesive comprises a two component system, one component of which is a polymer or resin which is intrinsically tacky, such as, a tacky elastomer, or has intermixed therewith, a resin imparting tackiness and a second component which is a tack controlling component to reduce the tack of the adhesive layer to the desired peel bond value. The second component also imparts cutting properties to the adhesive layer so that it will cut when the transferrable film, i.e., the facing layer is cut.

Figure 7:
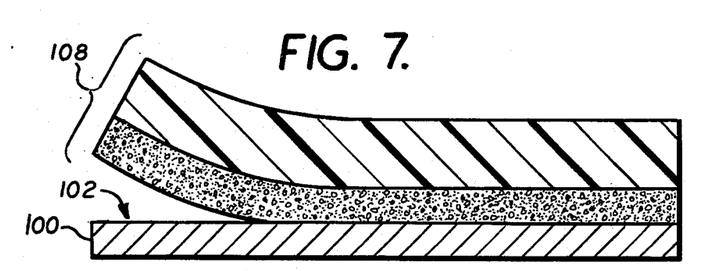

Also, as shown in FIG. 7, it is important in the use of conventional pressure sensitive adhesive materials that the adhesive layer, 104, remain with the facing layer, and not with the release layer 100 upon stripping.

The second component is preferably a readily deformable material in order to allow the adhesive layer to make adequate contact with the receiving surface of the substrate which may be rough in texture. The tack controlling component is usually present in concentrations of from about 6 to 65 parts per 100 parts of the total tacky compound.

Intrinsically tacky polymers include polyacrylic or methacrylic esters and acids; polyvinyl ethers; co-polymers of vinyl ethers and the aforesaid acrylic compounds; polyisobutylene and polybutenes; natural rubber; synthetic polyisoprene; polyvinylesters; polychloroprene; polybutadiene and co-polymers of butadiene with styrene.

Tackifying resins include hydrocarbon resins, terpene resins, such as, polybeta-pinene resin; resin derivatives, such as, hydrogenated resins and esters and liquid mixtures of polymeric styrene and homologues. Preferred materials are polyvinylbutylether; polyvinylethylether; polyvinylmethylether; polybutylacrylate or co-polymers of butylacrylate and methacrylate.

A detailed description of such materials is set forth in U.S. Pat. No. 2,432,376, incorporated herein by reference.

Subsequent to the application of pressure sensitive adhesive layer 104, the laminate is subjected to a drying or curing step, such as, for example, heating, and other methods which are conventionally used for such pressure sensitive adhesive materials. Understandably, the particular method used will be dependent upon the nature of the pressure sensitive adhesive material used; however, such methods are conventional in the art.

The pressure sensitive adhesive materials conventionally used are either soluble or dispersible in water or organic solvents. Also, materials have been developed which are themselves liquids, or possess relatively high solids content, but nevertheless can be coated or applied without dilution or emulsification. Also known are materials known as the "hot melt" type which are rendered coatable by heating. However, the particular type of pressure sensitive material used is not critical so long as it fulfills its function as a pressure sensitive adhesive and does not adversely affect the other desirable properties of the laminate.

Figure 6:
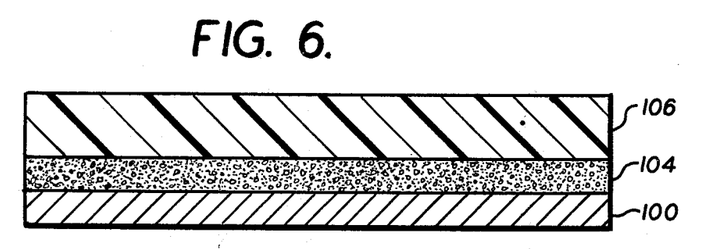

Subsequent to the curing step, a facing layer 106 is married to the first laminate of FIG. 5 to form the final laminate shown in FIG. 6.

Facing layer 106 is generally a sheet-like material which can be decorative or protective in nature and can be wood, including wood veneer, metal, such as, metal foil, paper or a plastic film forming material, e.g., vinyl polymers such as, polyvinyl chloride, polyvinylidene chloride, copolymers of polyvinyl chloride and polyvinylidene chloride; polyolefins, e.g., polypropylene, polyethylene; polyesters, etc., woven or non-woven fabric, and the like. Typically, the facing layer may have a decorative pattern embossed, printed, or otherwise imposed thereon. Alternately, the facing layer may be composed of two or more separate sub-layers.

For example, it is possible to use a top layer which is a substantially transparent sheet of a protective film, e.g., polyvinyl chloride, polyvinylidene chloride, copolymers of polyvinyl chloride and polyvinylidene chloride; polyester, polypropylene, polyethylene, polyacrylate, urethanes, hard surfaced resins, etc., and a lower sheet which may be composed of the same type materials as described hereinabove with respect to a single facing layer.

Generally, such a transparent layer can serve the function both of protecting the decorative pattern of the bottom facing sheet, and in addition, can itself contribute to the over-all decorative appearance of the laminate, as by producing a shiny effect or high gloss.

Other types of decorative facing layers, such as, flocked fabrics or films, and polymeric films, such as, polyester films having a thin deposit of metal thereon (metalized), vinyl films coated with resin-pigment combinations in a decorative pattern, and the like can be used as the facing layer.

FIG. 7 shows the method of utilization of the laminate in accordance with the present invention wherein components 104 and 106, generally designated as 108, are separated from backing sheet 100.

After stripping backing layer 100 from layers 108, the combination of layers designated 108 may be applied to the desired substrate, e.g., furniture, walls, cabinet surfaces, etc. By virtue of the unique properties of laminate 108 bestowed on it by the modification of the pressure sensitive adhesive which will be described hereinafter, it is possible to easily position layer 108 onto the substrate, to easily remove it and to reposition it if necessary. Moreover, if portions of the pressure sensitive adhesive side of laminate 108 should touch one another, they are easily pulled apart without disturbing the uniformity of the pressure sensitive adhesive layer. Consequently, the usual tangles, wrinkles, creases, stretches, etc., frequently encountered with pressure sensitive coated material of this type are avoided.

From the above it can be seen that the laminate of the present invention possesses a number of advantageous properties as compared to the majority of laminates generally used for the same type of purpose which have been previously known. The disadvantages of such prior laminates have been outlined hereinabove. More particularly, by virtue of the nature of the modification of the pressure sensitive adhesive used in the laminate of the present invention the present laminate, over all, is substantially easier to handle with respect to its application to a substrate than are most prior known laminates.

Thus, generally, the present laminate (after separation of the release layer), upon being initially positioned onto the desired substrate, for example, a wall, can be easily removed without any adverse affects should it be desired to reposition the laminate. This might occur, for example, in the case where the laminate, in its initial application to the substrate, was not straight, or possessed wrinkles, or bubbles. In such a case, the laminate may be easily removed by the applier without stretching the laminate or difficulty in pulling it from the substrate.

Moreover, should the laminate, during application, become folded upon itself so that different areas of the pressure sensitive adhesive surface touch one another, they, in turn can be easily pulled apart without difficulty by the applier, and without adversely affecting the laminate for purposes of its reapplication.

Additionally, once the laminate has been applied to the satisfaction of the applier, it possesses sufficient adhesion to the substrate, so as to remain in the position applied. Also, over a period of time, for example, 20 minutes to an hour, the adhesion, or peel value as it is hereinafter defined, increases to a sufficiently high value to produce a permanent application to the substrate.

It is difficult to quantify the ease or difficulty with which the laminate can be initially applied or after such initial application, removed from the substrate. Thus, the ease of application of the laminate depends on the skill of the person applying the laminate as well as the nature of the particular substrate to which it is being applied. Many types of substrates, for example, walls, composed of painted wall board, painted cinder block or plastic, etc., will be encountered by the typical user of this laminate, i.e., the consumer, As a result, depending on the particular nature of the end use, the ease of application and specific properties with respect to degree of adherence encountered with each of the different types of substrates will vary in an undeterminable manner.

Unquestionably, however, for any given substrate, the person using the present laminate will encounter substantially less difficulty in applying the laminate of the present invention as compared to use of the majority of prior art laminates, i.e., a laminate without the specific modification to the pressure sensitive adhesive required in the present invention or that described in previously mentioned U.S. patent application Ser. No. 568,988.

Specifically, the pressure sensitive adhesive layer of the laminate of the present invention possesses means for decreasing the "zero minute peel value" (as defined hereinafter) of the facing layer-pressure sensitive adhesive layer combination composed of a polysiloxane material intimately mixed with the pressure sensitive adhesive prior to the adhesive layer being coated.

Thus, by virtue of the presence of the polysiloxane component of the present laminate, there is produced a substantially decreased initial adhesion of the laminate for a particular substrate as compared to that which would be encountered with a laminate not possessing the polysiloxane component.

Additionally, however, the amount of actual adhesion at the time of initial application of the laminate to the substrate is sufficient so as to assure that the laminate will remain adhered to the substrate and not separate by virtue of the laminate's own weight.

Moreover, as noted hereinabove, the adhesion of the laminate of the present invention to the substrate builds up within a reasonable amount of time so as to provide a permanent installation which is essentially equivalent to that obtained with a laminate without the improvement of the present invention.

Yet a further advantage of the present invention is its unusual characteristic of regenerating relatively low zero minute peel values after a substantial residence time on a substrate. That is to say, if the present laminate is applied to a given substrate and allowed to remain for a given period of time, e.g., eight hours, upon removal from the substrate (assuming such removal can be effected without mutilating or destroying the substrate or laminate), it has been found that the laminate will exhibit a relatively low zero minute peel value. Thus, the unique properties of the present laminate with respect to its ease of initial application are not destroyed by virtue of such application, but continue to reappear should it be necessary to remove the laminate from the given substrate.

Another important feature of the laminate of the present invention is its excellent slip characteristics relative to the substrate. While this characteristic depends to some extent on the substrate involved, invariably, the lateral slip is substantially better with the present laminate than with a Control Laminate (defined hereinafter).

As used herein, the term "slip" means the ability of the laminate to slide on the substrate under light hand pressure. This property is quite difficult to quantify, although it is quite noticeable to the applier.

In order to more quantitatively characterize the improved properties of the present laminate, the discussion following hereinafter will utilize a number of defined terms relating to the degree of adhesion of the laminate to a given substrate after a specified amount of time. Additionally, because, as noted above, many different types of substrates will be encountered, in an attempt to generally characterize the substrates, the defined values will be further limited to specific test substrate materials which are also described in detail hereinafter.

Additionally, in characterizing the properties of the present laminate, it is necessary to define such characteristics in terms of the difference between those same characteristics possessed by a Control Laminate. Such a Control Laminate consists of a laminate which is identical to the laminate of the present invention, except for the fact that the pressure sensitive adhesive does not contain the polysiloxane of the present invention.

Referring now to the polysiloxane utilized to modify the pressure sensitive adhesive, it must be devoid of certain properties which, if possessed, would make it unsuitable for use in the present laminate. That is to say, if it possessed such properties, the resulting laminate would not possess the advantages of the present laminate. For example, the polysiloxane material should preferably possess some affinity for the pressure sensitive adhesive.

In this respect, the polysiloxane utilized in the present invention may be qualitatively characterized as a non-release material. That is to say, in the art, a "release material" is generally considered to be one which possesses relatively low affinity for a pressure sensitive adhesive and which easily separates from the pressure sensitive adhesive on peeling.

Thus, a substantial portion of the polysiloxane component of the pressure sensitive adhesive which may be at or near the interface of the pressure sensitive adhesive layer and the release surface will preferentially remain with the pressure sensitive adhesive layer rather than the release surface when the release surface is stripped from the pressure sensitive adhesive layer. Consequently, in this context, the polysiloxane possesses "non-release" properties.

In a similar manner, the polysiloxane material must possess certain other properties in order to make it suitable for use in the present laminate. Thus, the polysiloxane material must be dispersible or must have the capacity to be rendered dispersible through conventional chemical or mechanical means, e.g., viscosity modification, forming a solution of the polysiloxane in an appropriate solvent, heating, milling etc.

In addition, the dispersion of an effective amount of the polysiloxane material throughout the pressure sensitive adhesive layer should not cause a substantial decrease in the adherence of the pressure sensitive adhesive for the facing layer. Further, the polysiloxane material should not substantially adversely affect the ability of the pressure sensitive adhesive to achieve a strong but removable adherence of the laminate to the substrate to which it is applied.

As used herein, the term "intimately mixed", "completely dispersed" and the equivalent are meant to imply that the polysiloxane material is uniformly distributed throughout the pressure sensitive adhesive. It is believed that the polysiloxane material is present in the pressure sensitive adhesive in the form of a multiplicity of small beads or droplets. However, it is apparent, that the polysiloxane material cannot be uniformly distributed in the form of relatively large globules, which, while large, are spaced equal distances apart in the pressure sensitive adhesive. Thus, a typical distribution of the polysiloxane material in the pressure sensitive adhesive would have a multiplicity of such small droplets or beads within each square inch of the pressure sensitive adhesive layer of the laminate. FIGS. 5, 6, and 7 of the drawings illustrate this type of structure.

It is to be understood, of course, that many other configurations of the polysiloxane within the pressure sensitive adhesive layer are possible wherein droplet size and placement are modified. The skilled artisan would be aware, after an understanding of the present invention, of various configurations which may be desirable to produce a laminate possessing an appropriate zero minute peel value for any particular end use.

It is apparent that the distribution of the polysiloxane material can be effected in a variety of ways. However, the most preferred method of distribution has been found to be that obtained through a low speed, low shear mixing for at least several hours.

The speed and shear are preferably sufficiently low to prevent substantial quantities of air from being introduced into the pressure sensitive adhesive. The introduction of large quantities of air and resultant foaming of the adhesive can retard formation of the required intimate mixture of the polysiloxane in the adhesive or can result in uneven coating of the adhesive.

The time and speed of mixing are dependent upon the batch size and physical properties of the polysiloxane and the pressure sensitive adhesive. For large commercial batches, for example, 4,000-5,000 gallons, mixing times of about 6 to 20 hours and preferably about 14 to 16 hours at mixing speeds, with a two-blade stirrer, of about 30 to 200 revolutions per minute and preferably about 60 to 65 revolutions per minute have generally yielded acceptable mixtures. For smaller drum size batches, typically about 55 gallons, mixing with a two blade stirrer for about 1 to 3 hours and preferably about 2 hours at about 30 to 200 and preferably about 60 to 65 revolutions per minute has been found acceptable.

Acceptable mixing conditions can easily be determined by the skilled art worker since it is necessary only that an intimate and uniform mixture be obtained. Generally, the higher the speed of mixing, the less time required, and the larger the batch size, the greater the time required.

The polysiloxane material must, therefore, be in a physical form suitable for allowing it to be intimately mixed or dispersed throughout the pressure sensitive adhesive material without adversely affecting the suitability of the adhesive for use in such a laminate.

Consequently, the property of being dispersible, as that term is used herein, does not necessarily mean, that the polysiloxane material, in and of itself, must be of such a viscosity (or molecular weight), that it can be dispersed without further dilution or emulsification. It is sufficient that the material be susceptible to such dilution or emulsification, or other treatment, so as to allow it to be dispersed uniformly throughout the pressure sensitive adhesive. Typically, for example, such material can be formed into an emulsion (generally an aqueous emulsion) or dissolved in an appropriate solvent.

Understandably, the molecular weight, or the viscosity of the polysiloxane material is a factor in determining whether or not the material will be dispersible in accordance with the above definition. Considering the nature of the specific polysiloxane materials defined hereinbelow, it is clearly within the skill of the art worker to adjust the molecular weight, and/or the viscosity of the material so that it is dispersible.

It has been found advantageous, due to the small quantity of polysiloxane used relative to the amount of adhesive, to initially pre-mix the polysiloxane in a suitable solvent prior to incorporation into the adhesive. For example, when a water soluble polysiloxane and water based adhesive are used, it is desirable to pre-mix the polysiloxane in water prior to incorporation into the adhesive. Similarly, if an organic solvent system is being used, it is desirable to pre-mix the polysiloxane in a suitable organic solvent, e.g., isopropyl alcohol, prior to incorporation into the adhesive. Generally, a mixture of polysiloxane to solvent of from about 1:2 to 1:5 is helpful in obtaining the fastest final mixture of polysiloxane in adhesive. Of course, any water or other solvent added as part of the pre-mix must be taken into account in computing the final solids content and viscosity of the resulting modified pressure sensitive adhesive.

With respect to the characterizing parameters used herein, the following constitute defined terms:

1. PEEL VALUE

Die-cut 1"×6" samples of the laminate are mounted on 2"×6" surfaces of "Stainless Steel", "SBR" or "Acrylic" surfaces, as defined hereinafter. The specimens of the laminate are mounted by first removing the backing release sheet and placing the adhesive coated component in the center of the test panel. The specimen is smoothed onto the panel lightly with the hand leaving the last inch of the specimen free from the panel. Thereafter, a strip of the backing paper that was removed is placed under the last free inch in order to provide means for lifting the specimen from the test panel.

The specimen is then rolled using a 4½ pound rubber hand roller for 15 seconds in each direction employing no additional hand pressure, i.e., the total pressure is supplied by the weight of the roll itself.

The sample is then allowed to remain at room temperature for the specified period of time. In the case of the "zero minute peel" value or peel value at zero time, the specimen is removed from the panel with 10–15 seconds actual elapsed time from the time of mounting.

The test panel is mounted into the lower jaw of an Instron machine Model No. TM-2360-011, and the free end of the strip of backing paper is placed in the upper jaw. The sample is then peeled back on itself at an angle of 180° for a distance of about 2.5 inches and the average peel adhesion strength is recorded in grams per inch of width. This value represents the peel value for the indicated time period.

2. STAINLESS STEEL SURFACE

The stainless steel surface is a sample of stainless steel conforming to QQ-S-766, Class 302 or 304 (AISI 302 or 304) stainless steel having a bright annealed finish. The surface roughness height is 2.0 micro inches ±1.0 micro inches arithmatical average deviation from the mean line, as obtained from the Pressure Sensitive Tape Council, 1201 Waukegan Road, Glenview, Illinois 60025.

3. "ACRYLIC" SURFACE

A ⅜" standard wallboard surface painted with two coats (with a roller) of an interior white acrylic based latex paint (DuPont Lucite 2360 interior latex paint).

4. "SBR" SURFACE

A ⅜" standard wallboard surface painted with two coats (with a roller) of styrene-butadiene rubber based paint (Sherwin Williams Latex Interior Edgewater Blue).

5. FACE-TO-FACE PEEL VALUE

Two die-cut 1"×6" samples of the laminate with the release sheet removed are married adhesive coated side to adhesive coated side and are rolled using a 4½ pound rubber hand roller for 15 seconds in each direction employing no additional hand pressure, i.e., the total pressure is supplied by the weight of the roll itself. The last inch of each sample is unbonded in order to provide means for separating the samples from one another. This is accomplished by inserting a small piece of release sheet between the samples at this point.

Immediately following rolling, the test samples are mounted into the jaws of an Instron machine Model No. TM-2360-011, and the samples are then peeled apart at an angle of 180° for a distance of about 2.5 inches and the average peel adhesion strength is recorded in grams per inch of width.

6. RELEASE VALUE

A die-cut 1"×6" sample of the laminate with the release sheet attached is tested for the force required to separate the release sheet from the adhesive coated facing sheet.

One inch of the release sheet is peeled back by hand and is mounted into the jaw on an Instron machine. The release sheet is mounted into the upper jaw and the adhesive coated facing layer is mounted into the lower jaw. The release sheet is then peeled from the facing layer at an angle of 90° for a distance of about 2.5 inches and the average peel adhesion strength, indicating release value, is recorded in grams per inch of width.

7. Unless otherwise specified, all viscosities were measured at about 25° C. (room temperature) using a Brookfield Synchro-Lectric, Model LVT viscometer and are reported in centipoises (cps).

Referring now in greater detail to the polysiloxane material, those materials which we have found to possess all of the above noted properties, and to produce the desired advantageous properties in the presently claimed laminate are dispersible polysiloxanes formed from monomeric units having structures (I) and (II) as follows:

and wherein $R_1$ is selected from the group consisting of:
(i) phenyl;
(ii) methyl;
(iii) tolyl;

wherein $R_7$ and $R_8$ may be the same or different and may be hydrogen, methyl, or ethyl, and wherein when $R_1$ is group (i), (ii), (iii) or (iv), the prime mole percent of structure (I) is from about 0.5 to 50 and the prime mole percent of structure (II) is from about 99.5 to 50, and (v) polyoxyalkylene having the structural formula wherein $R_6$ is hydrogen or a monovalent hydrocarbon group having from 1 to 10 carbon atoms, $R_5$ is an alkylene group having at least two carbon atoms, n and m are zero or numbers, the sum of n and m is at least 1 and the oxyalkylene unit $R_6O(C_3H_6O)_m(C_2H_4O)_n$ has a molecular weight of at least about 80, and wherein there are at least two units having structure (I) and at least three units having structure (II) and wherein the oxyalkylene unit constitutes from about 85 to 30 weight percent of the polysiloxane polymer; $R_2$ may be methyl, ethyl, or phenyl; and $R_3$, and $R_4$ may be the same or different and may be methyl or ethyl.

A preferred class of polysiloxanes are those wherein $R_1$ is the polyoxyalkylene unit described hereinabove. Methods for preparing this class of materials are described in U.S. Pat. No. 3,505,377 and U.S. Pat. No. Re. 27,541, both of which are incorporated herein by reference.

Particularly preferred in this class is a hydrolytically stable silicone surfactant composition containing a dimethylsiloxane-oxyalkylene block copolymer wherein the oxyalkylene unit of the copolymer contains oxyethylene and oxypropylene units.

These compounds preferably possess a molecular weight of at least about 1500 and in the structural formula, $R_6$ is a monovalent hydrocarbon group having from 1 to 10 carbon atoms. Generally, the oxyalkylene unit comprises about 15 to 60 weight percent oxyethylene units and there are at least about three units having structure (I) and at least about 40 units having structure (II).

Most preferably in this embodiment, $R_2$, $R_3$, and $R_4$ are methyl and the polysiloxane possesses a viscosity at room temperature of about 2000 to 2600 cps. as measured with a #4 spindle at 30 rpm.

Another preferred class of polysiloxanes wherein $R_1$ is the polyoxyalkylene group described hereinabove are those wherein $R_6$ is hydrogen. This means that the polyoxyalkylene unit is capped with a hydroxyl group at its terminus (herein referred to as hydroxy capped).

Generally, the oxyalkylene unit is composed of oxyethylene and/or oxypropylene segments and it possesses a molecular weight in the range from about 80 to 660. The weight percent of the OH groups is preferably in the range from about 0.9 to 4.5. These materials exhibit viscosities in the range from about 40 to 45 centistokes.

Still another class of polysiloxanes are those wherein $R_1$, $R_2$, $R_3$, and $R_4$ are methyl and the terminal group at the ends of the polysiloxane chains are hydroxy capped oxyalkylene units having a molecular weight in the range from about 120 to 700. The oxyalkylene portion of the terminal group can be either oxyethylene or oxypropylene segments.

In all cases wherein an oxyalkylene group is connected to a silicon atom in the main siloxane chain, it is attached through a non-hydrolyzable carbon-silicon bond.

It is noted that the above polysiloxanes can be referred to as either graft or block polymers, depending on the specific structure of the polymer and/or on the manner in which they are synthesized.

It is noted that inasmuch as the siloxane polymers utilized as the adhesive modifiers in the present laminate, must be dispersible, they are, generally, not cross-linked, nor do they cross-link over a period of time under normal storage conditions or in the absence of cross-linking agents.

Another class of desirable polysiloxanes useful in the present invention are those polysiloxanes wherein $R_1$ is phenyl, $R_2$ is phenyl or methyl, and $R_3$ and $R_4$ are methyl. Such polysiloxanes are particularly desirable when x is from about 0.5 to 30 and y is from about 99.5 to 70.0. Generally, when $R_1$ is phenyl and $R_2$, $R_3$, and $R_4$ are methyl, in accordance with the above, the preferred polysiloxane has a number average molecular weight from about 25,000 to 250,000, although here again, the prime factor in determining molecular weight is the ability to disperse or to render the polysiloxane dispersible. Particularly, preferred is a polysiloxane wherein $R_1$ is phenyl, and x is about 4.5, and the number average molecular weight is about 70,000.

Also desirable are polysiloxanes having the above structural formula wherein $R_1$ is methyl. In this case, it is clear that x would equal y. Generally, such polysiloxanes have a viscosity in the range from about $60 \times 10^3$ to $20 \times 10^6$ cps.

Another preferred polysiloxane within the scope of the above formula is that wherein $R_1$ is a vinyl group and x is from about 40 to 60, and y is from about 60 to 40, and the number average molecular weight is in the range from about $5 \times 10^5$ to $1 \times 10^6$.

As used herein, the term "prime mole percent" is the number ratio of the x type to y type siloxane units.

Such polysiloxanes as well as methods for their production are conventional and are described in detail in U.S. Pat. No. 2,560,498, the contents of which are incorporated herein by reference.

Typically, the polysiloxanes which can be used in the present invention have the structural formula:

wherein $R_1$, $R_2$, $R_3$, $R_4$ and the prime mole percent or number of structural units designated I and II are as defined above. $R_9$ and $R_{10}$ are polymer chain terminal groups. In the case of relatively long length polymer chains, i.e., high molecular weight polymers, the particular groups constituting $R_9$ and $R_{10}$ are present in trace amounts. Consequently, the effect of such groups, even if they are chemically reactive, i.e., can react with certain of the other chemical entities in the polymer, is minimal, and, as a practical matter, undetectable. In such a case, while it is preferred that $R_9$ and $R_{10}$ are hydrogen or saturated lower alkyl, e.g., having 1 to 10 carbon atoms, the particular chemical nature of such terminal groups is not critical so long, of course, as the groups do not adversely affect the desired properties of the polysiloxane.

In the event that the polymer chain is of shorter length, i.e., lower molecular weight, the terminal groups will, of course, provide a correspondingly greater contribution to the overall chemical and physical properties of the polymer. This is due to the increased proportion of the overall molecular weight represented by the terminal groups. Thus, in the relatively low molecular weight polysiloxanes used in the present invention, e.g., those possessing hydroxy capped oxyalkylene units, the hydroxyl groups do play a role in the overall properties of the polymers.

The subscript "n" represents the molecular weight of the polymer and, as discussed hereinabove, is such that the polysiloxane is dispersible.

As stated hereinabove the polysiloxane materials utilized in preparing the laminate of the present invention may be mixed or dispersed into the pressure sensitive adhesive using a variety of techniques well known and conventional in the art. Thus, for example, the polysiloxane whether it is used as is, or diluted either in a solvent or an aqueous emulsion may be blended into the pressure sensitive adhesive after manufacture of the adhesive, but prior to packaging; or at the plant where the adhesive is to be used, either by mixing the polysiloxane into batches of adhesive or metering and dispersing the polysiloxane into the adhesive immediately prior to the coating step during fabrication of the laminate. It is thus within the skill of the art to use any of these methods to introduce the polysiloxane material and to regulate the parameters affecting the distribution, e.g., mixing speed, configuration of mixing blades, duration of mixing, etc., so as to produce a uniform dispersion.

Insofar as the actual physical form of the polysiloxane material with respect to the dispersing technique is concerned, any type of conventional organic solvent e.g., aliphatic and aromatic organic solvents can be used. The controlling factor in the selection of such a solvent is merely that it be one which is commercially available and does not have an adverse influence on either the economics of the process or product and of course, does not adversely affect the product itself.

Alternately, the polysiloxanes may be incorporated into an aqueous emulsion using conventionally known emulsifying agents and conventional emulsifying techniques. Here again, such techniques are well known to the skilled artisan in this technical field.

It is further possible, depending on the viscosity of the undiluted polysiloxane material, to use it as is, without a diluent.

The amount of polysiloxane used can vary over a wide range and depends on the specific polysiloxane which is used, the technique used for dispersing the polysiloxane, the nature of the specific adhesion properties or tack properties of the pressure sensitive adhesive, and other parameters which would be characteristic of the specific process being used. However, conventional art techniques could be used to adjust and to optimize these parameters in order to optimize the product properties.

We have found, generally, that a concentration from about 0.001 to 20% by weight, and most preferably from about 0.1 to 1.0% by weight, based on the solids content of the pressure sensitive adhesive will lead to a product having properties within an optimal range.

In any event, the specific amount of polysiloxane and the specific manner of its dispersion should be regulated so as to produce a substantial decrease in the zero minute peel value of the product as compared to a control laminate and to provide for a twenty minute peel value of at least about 100 grams. Preferably, the reduction in the zero minute peel value as compared to the zero minute peel value of the control laminate is in the range of at least greater than about 25%. It is possible of course, that for a specific purpose, the skilled artisan might desire to decrease the percent reduction in the zero minute peel as compared to the control laminate.

The following examples illustrate the present invention:

The following examples illustrate the present invention:

EXAMPLE 1

A release sheet was prepared from kraft paper (42 pounds per ream) by coating it with a conventional silicone release finish, for example, Dow Corning Syloff 23 with DC 23A catalyst, the amount of coating being about 0.5 pounds per ream. The paper was coated on the machine finished side. The coating was carried out using an 80 line quadrangular gravure coating roll.

The solids content of the silicone release material in Tolusol 50 (a 1:1 mix of toluene and heptane) was 3.8%. After coating, the coated paper was subjected to drying and curing conditions in an oven at about 350° to 400° F. for about one minute.

The kraft paper used, in the usual commercial embodiments, generally carries printed information, e.g., application instructions, suggested use, measuring scales to facilitate cutting, etc., on the non-release side.

A dimethylsiloxane-oxyalkylene block copolymer containing oxyethylene and oxypropylene units and having a viscosity of about 2,250 cps. (#4 spindle at 30 rpm) (hereinafter referred to as "SIL-1") was dissolved in water with a propeller type stirrer to form a solution having a ratio of polysiloxane to water of about 1 to 3, respectively, by weight. This solution was slowly added to a butyl acrylate vinyl acetate copolymeric pressure sensitive adhesive having a solids content of about 50% by weight, a viscosity of about 480 cps. (#3 spindle at 60 rpm) and a plasticity of about 1.8 mm (hereinafter referred to as "PSA-1") contained in a 5,000 gallon tank fitted with a double blade mixer. The concentration of polysiloxane in the pressure sensitive adhesive was 0.2% by weight based on the solids content of the adhesive. The contents of the tank were then mixed by the double blade mixer at 60-65 rpm for 16 hours and the resulting mixture was coated onto the treated release layer by reverse roll coating. Alternatively, a 55 line quadrangular gravure roll can be used.

Thereafter, the coated release sheet was dried at about 240° F. for about 5-10 seconds to yield a dry deposit of polysiloxane modified pressure sensitive adhesive of from about 1 to 2 milligrams per square centimeter.

Finally, a polyvinyl chloride film having a thickness of about 3.5 mils was married to the thus coated release sheet by passing the combination through a nip at a pressure of about 30 psi. The final product was rolled into a suitable package for subsequent cutting and packaging. Sample pieces of the laminate produced by Example 1 were tested for zero minute peel, face to face peel, ease of application, etc., and were found to possess overall properties superior to those of a lamiate produced in similar fashion but with the absence of the polysiloxane.

EXAMPLE 2

The procedure of Example 1 was followed except that the polysiloxane used was a phenyl methyl dimethyl polysiloxane containing about 4.5 prime mole percent of phenyl methyl siloxane groups and having a viscosity of about 18,000 cps. (#4 spindle at 30 rpm) (hereinafter referred to as "SIL-2"). In addition, the polysiloxane material was added directly to the adhesive (PSA-1) without first dissolving the polysiloxane in water or other solvent and was added at a concentration of about 6% by weight based on the solids content of the adhesive.

The coating and laminating steps of Example 1 were followed and similar results were obtained.

EXAMPLE 3

The procedure of Example 1 was followed except that the silicone disclosed therein (SIL-1) was premixed with isopropyl alcohol in a ratio of about 1 to 2 respectively, by weight, and the resulting mixture was blended into an acrylic-vinyl acetate copolymeric pressure sensitive adhesive having a solids content of about 32%, a viscosity of about 490 cps. (#2 spindle at 30 rpm) and a plasticity of about 1.53 mm (hereinafter referred to as "PSA-3"). The polysiloxane concentration was approximately 0.5% by weight based on the solids content of the adhesive.

The remaining steps of coating and laminating as described in Example 1 were followed and again similar test results were obtained.

EXAMPLE 4

The procedure of Example 3 was followed except that the polysiloxane used was a siloxane-oxyalkylene block copolymer having a viscosity of about 2500 cps. (#4 spindle at 30 rpm) (hereinafter referred to as "SIL-3").

The resulting laminate exhibited peel values substantially better than a control sample made in similar fashion but without modifying the pressure sensitive adhesive with the polysiloxane.

EXAMPLE 5

A series of laminates in accordance with the present invention were prepared using the process conditions and components and procedures set forth in Example 1. However, a series of three different polysiloxanes and three different pressure sensitive adhesives were used and the concentration of the polysiloxane in the adhesive was varied to provide three different concentrations of each polysiloxane in each pressure sensitive adhesive. The concentrations were 0.25%, 0.50% and 0.75%; each percentage of polysiloxane in the pressure sensitive adhesive being based on the dry solids weight of the pressure sensitive adhesive.

The polysiloxanes used were SIL-1 of Example 1, SIL-2 of Example 2, and SIL-3 of Example 4. The pressure sensitive adhesives used were PSA-1 of Example 1, PSA-3 of Example 3, and an additional pressure sensitive adhesive (PSA-2) which was a water based acrylic terpolymer pressure sensitive adhesive having a plasticity of about 3.5 mm., a viscosity of about 480 cps. (#3 spindle at 60 rpm) and a solids content of about 56% by weight.

For PSA-1 and PSA-2, the polysiloxanes were added in the form of a pre-mix with water at a ratio of one part polysiloxane to three parts water. For PSA-3, isopropyl alcohol was used instead of water in the same proportions.

The coating and laminating procedures of Example 1 were followed and the resulting laminates were tested for face-to-face peel, zero minute peel, 20 minute peel, 16 hour peel, and 7 day peel. The zero minute, 20 minute and 16 hour peels were determined on stainless steel, "SBR" and "ACRYLIC" surfaces. The 7 day peel value was determined only on a stainless steel surface. The results of these determinations are set forth in Table 1 hereof.

In addition to the testing of samples in accordance with the present invention, the three adhesives used were additionally tested without the addition of a polysiloxane material and act as a "Control" for comparative purposes. These control samples were prepared in an identical manner to each of the other samples except that they were not modified by the addition of a polysiloxane material.

The results obtained are set forth in Table 1.

EXAMPLE 6

A laminate was prepared according to the procedure of Example 1, utilizing PSA-1 which had been modified by incorporation of 0.5%, based on the dry solids weight of the adhesive, of a dimethylsiloxane-hydroxy capped oxyalkylene graft copolymer having a viscosity of about 465 centistokes, an average weight percent of hydroxyl units of 2 and an average of 3 hydroxyl units per molecule (hereinafter referred to as SIL-4).

An additional laminate was prepared according to a similar procedure with PSA-1 modified by incorporation of 0.5% by weight, based on the dry solids weight of the adhesive, of a dimethylpolysiloxane having hydroxy capped oxyethylene terminal groups (hereinafter referred to as SIL-5). The viscosity of this polysiloxane was about 320 centistokes and it contained an average weight percent of hydroxyl units of about 1.5 and an average of 2 hydroxyl groups per molecule.

The two laminates prepared as described above were tested for face-to-face peel and release value, and zero minute peel, 20 minute peel, and 16 hour peel on stainless steel and acrylic surfaces.

In addition, a laminate prepared with PSA-1 unmodified by the addition of a polysiloxane and prepared in the same manner as the two laminates described above was tested in similar fashion as a control.

The results of this comparative testing are set forth in Table 2.

TABLE 1

PEEL VALUE (GRAMS) AFTER ROOM TEMPERATURE AGING

| Sample Conc. (%) | Polysiloxane/ Pressure Sensitive Adhesive | Face-To-Face | ZERO MINUTES | | | 20 MINUTES | | | 16 HOURS | | | 7 DAYS |
|---|---|---|---|---|---|---|---|---|---|---|---|---|
| | | | SS | SBR | ACR | SS | SBR | ACR | SS | SBR | ACR | SS |
| A | PSA 1 Control | 506 | 509 | 407 | 604 | 595 | 604 | 950 | 830 | 1071 | 1116 | 925 |
| B | PSA 2 Control | 395 | 405 | 430 | 502 | 450 | 475 | 590 | 640 | 710 | 800 | 880 |
| C | PSA 3 Control | 792 | 570 | 430 | 570 | 855 | 602 | 799 | 1176 | 934 | 830 | 1450 |
| D 0.25 | Sil 1 PSA 1 | 360 | 225 | 290 | 315 | 330 | 400 | 535 | 605 | 635 | 750 | 815 |
| E 0.50 | Sil 1 PSA 1 | 310 | 235 | 275 | 295 | 320 | 360 | 510 | 595 | 625 | 665 | 785 |
| F 0.75 | Sil 1 PSA 1 | 280 | 230 | 250 | 270 | 300 | 350 | 500 | 585 | 605 | 640 | 750 |
| G 0.25 | Sil 2 PSA 1 | 480 | 320 | 355 | 393 | 430 | 575 | 615 | 750 | 800 | 945 | 940 |
| H 0.50 | Sil 2 PSA 1 | 445 | 305 | 355 | 382 | 415 | 565 | 605 | 735 | 800 | 930 | 940 |
| I 0.75 | Sil 2 PSA 1 | 420 | 290 | 350 | 375 | 410 | 560 | 610 | 730 | 800 | 925 | 940 |
| J 0.25 | Sil 3 PSA 1 | 370 | 225 | 250 | 270 | 360 | 375 | 480 | 500 | 540 | 660 | 680 |
| K 0.50 | Sil 3 PSA 1 | 305 | 210 | 225 | 240 | 340 | 370 | 430 | 480 | 530 | 630 | 650 |
| L 0.75 | Sil 3 PSA 1 | 275 | 200 | 205 | 238 | 320 | 370 | 405 | 460 | 520 | 590 | 620 |
| M 0.25 | Sil 1 PSA 2 | 290 | 230 | 280 | 315 | 370 | 455 | 530 | 605 | 650 | 740 | 770 |
| N 0.50 | Sil 1 PSA 2 | 275 | 210 | 265 | 290 | 360 | 415 | 495 | 600 | 650 | 715 | 745 |
| O 0.75 | Sil 1 PSA 2 | 225 | 200 | 260 | 270 | 350 | 400 | 480 | 580 | 640 | 700 | 740 |
| P 0.25 | Sil 2 PSA 2 | 390 | 245 | 300 | 330 | 360 | 450 | 590 | 610 | 650 | 780 | 810 |
| Q 0.50 | Sil 2 PSA 2 | 380 | 215 | 285 | 305 | 345 | 405 | 570 | 595 | 605 | 755 | 785 |
| R 0.75 | Sil 2 PSA 2 | 375 | 205 | 270 | 285 | 310 | 385 | 540 | 550 | 585 | 705 | 750 |
| S 0.25 | Sil 3 PSA 2 | 285 | 225 | 245 | 260 | 340 | 360 | 420 | 490 | 500 | 585 | 660 |
| T 0.50 | Sil 3 PSA 2 | 260 | 205 | 205 | 235 | 310 | 360 | 380 | 455 | 480 | 555 | 600 |
| U 0.75 | Sil 3 PSA 2 | 210 | 180 | 195 | 205 | 295 | 340 | 350 | 430 | 460 | 505 | 590 |
| V 0.25 | Sil 1 PSA 3 | 255 | 275 | 280 | 320 | 400 | 435 | 500 | 490 | 520 | 675 | 765 |
| W 0.50 | Sil 1 PSA 3 | 140 | 240 | 260 | 300 | 380 | 420 | 480 | 470 | 500 | 650 | 725 |
| X 0.75 | Sil 1 PSA 3 | 130 | 220 | 205 | 255 | 350 | 400 | 440 | 450 | 470 | 575 | 610 |
| Y 0.25 | Sil 2 PSA 3 | 650 | 360 | 390 | 410 | 420 | 465 | 500 | 725 | 740 | 800 | 835 |
| Z 0.50 | Sil 2 PSA 3 | 600 | 330 | 375 | 395 | 400 | 440 | 470 | 700 | 730 | 780 | 800 |
| AA 0.75 | Sil 2 PSA 3 | 580 | 310 | 350 | 360 | 385 | 410 | 450 | 680 | 700 | 750 | 780 |
| BB 0.25 | Sil 3 PSA 3 | 270 | 230 | 240 | 260 | 350 | 370 | 410 | 480 | 505 | 575 | 600 |
| CC 0.50 | Sil 3 PSA 3 | 135 | 210 | 215 | 225 | 310 | 350 | 370 | 440 | 475 | 540 | 575 |
| DD 0.75 | Sil 3 PSA 3 | 120 | 180 | 190 | 200 | 290 | 330 | 350 | 420 | 460 | 500 | 560 |

TABLE 2

PEEL VALUE (GRAMS) AFTER ROOM TEMPERATURE AGING

| Sample Conc. (%) | Polysiloxane Pressure Sensitive Adhesive | Face-To-Face | ZERO MINUTE SS | ACRYLIC | 20 MINUTES SS | ACRYLIC | 16 HOURS SS | ACRYLIC | RELEASE VALUE |
|---|---|---|---|---|---|---|---|---|---|
| EE | PSA 1 Control | 509 | 458 | 416 | 491 | 720 | 1214 | 791 | 37 |
| FF 0.5% | SIL 4 PSA 1 | 208 | 241 | 67 | 405 | 198 | 701 | 857 | 17 |
| GG 0.5% | SIL 5 PSA 1 | 161 | 84 | 178 | 108 | 203 | 307 | 867 | 5 |

EXAMPLE 7

A modified pressure sensitive adhesive was prepared by dispersing SIL-1 in an aqueous emulsion of an acrylic-vinyl acetate copolymeric pressure sensitive adhesive having a solids content of about 50% by weight, a viscosity of about 480 cps. (#3 spindle at 60 rpm) and a plasticity of about 1.8 mm (hereinafter referred to as PSA-4). The concentration of SIL-1 in PSA-4 was about 0.75% based on the dry solids weight of the adhesive.

The modified pressure sensitive adhesive was direct coated onto a polyvinyl chloride film having a thickness of about 3.5 mils by a 55 line quadrangular gravure roll to an average thickness of about 0.5 mil and a dry deposit of about 1.6 mg/cm².

The resulting laminate was married to a release sheet prepared from kraft paper (42 pounds per ream) coated with a conventional silicone release finish.

Upon stripping the release film from the laminate a product was obtained exhibiting relatively low face-to-face peel and possessing overall properties superior to those of a laminate produced in similar fashion but with the absence of the polysiloxane modification of the pressure sensitive adhesive.

The present invention has been described with reference to many particular details thereof. It is obvious, however, that various modifications of the invention will be possible by those skilled in the art from the foregoing teachings and it is not intended that these details shall be construed as limiting the scope of the invention.

Having thus described our invention what we desire to secure and claim by Letters Patent is:

1. A method for making a laminate comprising coating a first sheet having a release surface thereon with a modified pressure sensitive adhesive to form a first laminate, subjecting said first laminate to conditions suitable to dry or cure the pressure sensitive adhesive, and marrying the pressure sensitive adhesive side of the thus treated first laminate to the inner surface of a facing layer having inner and outer surfaces; said modified pressure sensitive adhesive comprising a pressure sensitive adhesive and means for decreasing the "zero minute peel value" of the facing layer-pressure sensitive adhesive layer combination, said means comprising a polysiloxane intimately mixed with the pressure sensitive adhesive, said polysiloxane being formed from monomeric units having structures (I) and (II) as follows:

and wherein $R_1$ is selected from the group consisting of:
(i) phenyl;
(ii) methyl;
(iii) tolyl;

wherein $R_7$ and $R_8$ may be the same or different and may be hydrogen, methyl, or ethyl, and wherein when $R_1$ is group (i), (ii), (iii) or (iv), the prime mole percent of structure (I) is from about 0.5 to 50 and the prime mole percent of structure (II) is from about 99.5 to 50, and (v) polyoxyalkylene having the structural formula wherein $R_6$ is hydrogen or a monovalent hydrocarbon group having from 1 to 10 carbon atoms, $R_5$ is an alkylene group having at least two carbon atoms, n and m are zero or numbers, the sum of n and m is at least 1 and the oxyalkylene unit $R_6O(C_3H_6O)_m (C_2H_4O)_n$, has a molecular weight of at least about 80, and wherein there are at least two units having structure (I) and at least three units having structure (II) and wherein the oxyalkylene unit constitutes from about 85 to 30 weight percent of the polysiloxane polymer;

$R_2$ may be methyl, ethyl, or phenyl; and $R_3$, and $R_4$ may be the same or different and may be methyl or ethyl.

2. The method of claim 1 wherein the polysiloxane is present in an amount effective to substantially decrease the "zero minute peel value" from the "zero minute peel value" of a control laminate wherein the polysiloxane is absent.

3. The method of claim 1 wherein the polysiloxane is present in an amount effective to decrease the "zero minute peel value" of the laminate by at least about 25 percent from the "zero minute peel value" of the control laminate.

4. The method of claim 1 wherein the polysiloxane is present in an amount effective to produce a "zero minute peel value" of less than about 600 grams on a stainless steel test surface and less than about 500 grams on "acrylic" and "SBR" test surfaces.

5. The method of claim 1 wherein the amount of polysiloxane present is in the range from about 0.001 to 20 percent based on the solids content of the pressure sensitive adhesive.

6. The method of claim 1 wherein the amount of polysiloxane present is in the range from about 0.1 to 1.0 percent based on the solids content of the pressure sensitive adhesive.

7. The method of claim 1 wherein $R_1$ is phenyl, and $R_2$, and $R_3$, and $R_4$ are methyl.

8. The method of claim 7 wherein the prime mole percent of structure (I) is from about 0.5 to 30 and the prime mole percent of structure (II) is from about 99.5 to 70.

9. The method of claim 8 wherein the prime mole percent of structure (I) is about 4.5 and the prime mole percent of structure (II) is about 95.5.

10. The method of claim 7 wherein the molecular weight of the polysiloxane is from about 35,000 to 250,000.

11. The method of claim 1 wherein $R_1$ is phenyl, $R_2$ is phenyl, and $R_3$ and $R_4$ are methyl.

12. The method of claim 1 wherein $R_1$ is methyl, the prime mole percents of structures (I) and (II) are equal and the viscosity of the polysiloxane is in the range from about $60 \times 10^3$ to $20 \times 10^6$ cps.

13. The method of claim 1, wherein $R_1$ is and $R_7$ and $R_8$ are hydrogen, the prime mole percent of structure (I) is from about 40.0 to 60.0 and the prime mole percent of structure (II) is from about 60.0 to 40.0, and the polysiloxane possesses a molecular weight from about $5 \times 10^5$ to $1 \times 10^6$.

14. The method of claim 1 wherein $R_1$ is polyoxyalkylene and the oxyalkylene unit possesses a molecular weight of at least about 1500, wherein $R_6$ is a monovalent hydrocarbon group having from 1 to 10 carbon atoms, and contains both oxyethylene and oxypropylene units.

15. The method of claim 14 wherein the oxyalkylene unit comprises from about 15 to 60 weight percent oxyethylene units.

16. The method of claim 15 wherein there are at least about three units having structure (I) and at least about 40 units having structure (II).

17. The method of claim 16 wherein $R_2$, $R_3$ and $R_4$ are methyl.

18. The method of claim 17 wherein the polysiloxane has a viscosity at room temperature of about 2,000 to 2,600 cps. measured with a #4 spindle at 30 rpm.

19. The method of claim 1 wherein $R_1$, $R_2$, $R_3$ and $R_4$ are methyl and the terminal groups of the polymer are hydroxy oxyalkylene units.

20. The method of claim 19 wherein the weight percent OH is from about 1.4 to 1.6.

21. The method of claim 20 wherein the oxyalkylene portion of the terminal group comprises oxypropylene units or oxyethylene units.

22. The method of claim 21 wherein the oxyalkylene portion has a molecular weight in the range from about 120 to 700.

23. The method of claim 1 wherein $R_1$ is polyoxyalkylene, $R_6$ is hydrogen, and the oxyalkylene unit possesses a molecular weight in the range from about 80 to 660.

24. The method of claim 23 wherein the weight percent OH is from about 0.9 to 4.5.

25. The method of claim 23 wherein the polysiloxane possesses a viscosity in the range from about 40 to 465 centistokes.

26. The method of claim 1 wherein the facing layer is selected from the group consisting of woven, knitted, and non-woven textile fabrics, metal foils, paper, a continuous film of a polymer selected from the group consisting of vinyl polymers, poyolefins, polyesters, and such polymeric films having metallic coatings thereon.

27. The method of claim 1, wherein the facing layer is itself composed of a bottom decorative layer and a top, transparent protective layer.

28. The method of claim 1, wherein the polysiloxane is intimately mixed with the pressure sensitive adhesive a substantial time prior to the coating of said first sheet with the pressure sensitive adhesive.

29. The method of claim 1, wherein the polysiloxane is intimately mixed with the pressure sensitive adhesive during the coating of said first sheet with the pressure sensitive adhesive.

30. The method of claim 1, wherein the outer surface of the facing layer possesses release properties and wherein, subsequent to the marrying step, the first sheet is peeled from the laminate to form a second laminate composed of the facing layer, and the modified pressure sensitive adhesive layer, and wherein the second laminate is rolled upon itself.

31. A method for making a laminate comprising coating a facing layer having outer and inner surfaces with a layer of a modified pressure sensitive adhesive to form a first laminate, subjecting said first laminate to conditions suitable to dry or cure the pressure sensitive adhesive, and marrying the pressure sensitive adhesive side of the thus treated first laminate to a release surface; said modified pressure sensitive adhesive comprising a pressure sensitive adhesive and means for decreasing the "zero minute peel value" of the facing layer-pressure sensitive adhesive layer combination, said means comprising a polysiloxane intimately mixed with the pressure sensitive adhesive, said polysiloxane being formed from monomeric units having structures (I) and (II) as follows:

wherein $R_1$ is selected from the group consisting of:
(i) phenyl;
(ii) methyl;
(iii) tolyl;

wherein $R_7$ and $R_8$ may be the same or different and may be hydrogen, methyl, or ethyl, and wherein when $R_1$ is group (i), (ii), (iii) or (iv), the prime mole percent of structure (I) is from about 0.5 to 50 and the prime mole percent of structure (II) is from about 99.5 to 50, and (v) polyoxyalkylene having the structural formula $$-R_5(OC_2H_4)_n(OC_3H_6)_mOR_6$$

wherein $R_6$ is hydrogen or a monovalent hydrocarbon group having from 1 to 10 carbon atoms, $R_5$ is an alkylene group having at least two carbon atoms, n and m are zero or numbers, the sum of n and m is at least 1 and the oxyalkylene unit $R_6O(C_3H_6O)_M(C_2H_4O)_n$, has a molecular weight of at least about 80, and wherein there are at least two units having structure (I) and at least three units having structure (II) and wherein the oxyalkylene unit constitutes from about 85 to 30 weight percent of the polysiloxane polymer; $R_2$ may be methyl, ethyl, or phenyl; and $R_3$, and $R_4$ may be the same or different and may be methyl or ethyl.

32. The method of claim 31 wherein the polysiloxane is present in an amount effective to substantially decrease the "zero minute peel value" from the "zero minute peel value" of a control laminate wherein the polysiloxane is absent.

33. The method of claim 31 wherein the polysiloxane is present in an amount effective to decrease the "zero minute peel value" of the laminate by at least about 25% from the "zero minute peel value" of the control laminate.

34. The method of claim 31 wherein the polysiloxane is present in an amount effective to produce a "zero minute peel value" of less than about 600 grams on a stainless steel test surface and less than about 500 grams on "acrylic" and "SBR" test surfaces.

35. The method of claim 31 wherein the amount of polysiloxane present is in the range from about 0.001 to 20 percent based on the solids content of the pressure sensitive adhesive.

36. The method of claim 31 wherein the amount of polysiloxane present is in the range from about 0.1 to 1.0 percent based on the solids content of the pressure sensitive adhesive.

37. The method of claim 31 wherein $R_1$ is phenyl, and $R_2$, and $R_3$, and $R_4$ are methyl.

38. The method of claim 37 wherein the prime mole percent of structure (I) is from about 0.5 to 30 and the prime mole percent of structure (II) is from about 99.5 to 70.

39. The method of claim 38 wherein the prime mole percent of structure (I) is about 4.5 and the prime mole percent of structure (II) is about 95.5.

40. The method of claim 37 wherein the molecular weight of the polysiloxane is from about 35,000 to 250,000.

41. The method of claim 31 wherein $R_1$ is phenyl, $R_2$ is phenyl, and $R_3$ and $R_4$ are methyl.

42. The method of claim 31 wherein $R_1$ is methyl, the prime mole percents of structures (I) and (II) are equal and the viscosity of the polysiloxane is in the range from about $60 \times 10^3$ to $20 \times 10^6$ cps.

43. The method of claim 31 wherein $R_1$ is and $R_7$ and $R_8$ are hydrogen, the prime mole percent of structure (I) is from about 40.0 to 60.0 and the prime mole percent of structure (II) is from about 60.0 to 40.0, and the polysiloxane possesses a molecular weight from about $5 \times 10^5$ to $1 \times 10^6$.

44. The method of claim 31 wherein $R_1$ is polyoxyalkylene and the oxyalkylene unit possesses a molecular weight of at least about 1500, wherein $R_6$ is a monovalent hydrocarbon group having from 1 to 10 carbon atoms, and contains both oxyethylene and oxypropylene units.

45. The method of claim 44 wherein the oxyalkylene unit comprises from about 15 to 60 weight percent oxyethylene units.

46. The method of claim 45 wherein there are at least about three units having structure (I) and at least about 40 units having structure (II).

47. The method of claim 46 wherein $R_2$, $R_3$ and $R_4$ are methyl.

48. The method of claim 47 wherein the polysiloxane has a viscosity at room temperature of about 2,000 to 2,600 cps. measured with a #4 spindle at 30 rpm.

49. The method of claim 31 wherein $R_1$, $R_2$, $R_3$ and $R_4$ are methyl and the terminal groups of the polymer are hydroxy oxyalkylene units.

50. The method of claim 49 wherein the weight percent OH is from about 1.4 to 1.6.

51. The method of claim 50 wherein the oxyalkylene portion of the terminal group comprises oxypropylene units or oxyethylene units.

52. The method of claim 51 wherein the oxyalkylene portion has a molecular weight in the range from about 120 to 700.

53. The method of claim 31 wherein $R_1$ is polyoxyalkylene, $R_6$ is hydrogen, and the oxyalkylene unit possesses a molecular weight in the range from about 80 to 660.

54. The method of claim 53 wherein the weight percent OH is from about 0.9 to 4.5.

55. The method of claim 53 wherein the polysiloxane possesses a viscosity in the range from about 50 to 465 centistokes.

56. The method of claim 31 wherein the outer surface of the facing layer is the release surface and the marrying step is carried out by rolling the first laminate upon itself.

57. The method of claim 31 wherein the outer surface of the facing layer is the release surface and wherein the marrying step is carried out by cutting the second laminate into separate substantially equally sized pieces and stacking one piece upon another such that the pressure sensitive adhesive layer of one piece is next to the outer surface of the facing layer of the next piece in the stack.

58. A laminate made according to the method of claim 1.

59. A laminate made according to the method of claim 31.

60. A pressure sensitive adhesive composition comprising a mixture of a pressure sensitive adhesive and a polysiloxane, said polysiloxane being formed from monomeric units having structures (I) and (II) as follows:

and

-continued (II)

wherein $R_1$ is selected from the group consisting of:
(i) phenyl;
(ii) methyl;
(iii) tolyl;

(iv)

wherein $R_7$ and $R_8$ may be the same or different and may be hydrogen, methyl, or ethyl, and wherein when $R_1$ is group (i), (ii), (iii) or (iv), the prime mole percent of structure (I) is from about 0.5 to 50 and the prime mole percent of structure (II) is from about 99.5 to 50, and
(v) polyoxyalkylene having the structural formula wherein $R_6$ is hydrogen or a monovalent hydrocarbon group having from 1 to 10 carbon atoms, $R_5$ is an alkylene group having at least two carbon atoms, ln and m are zero or numbers, the sum of n and $m$ is at least 1 and the oxyalkylene unit $R_6O(C_3H_6O)_m(C_2H_4O)_n$, has a molecular weight of at least about 80, and wherein there are at least two units having structure (I) and at least three units having structure (II) and wherein the oxyalkylene unit constitutes from about 85 to 30 weight percent of the polysiloxane polymer; $R_2$ may be methyl, ethyl, or phenyl; and $R_3$, and $R_4$ may be the same or different and may be methyl or ethyl.

61. The pressure sensitive adhesive composition of claim 60 wherein the amount of polysiloxane present is in the range from about 0.001 to 20 percent based on the solids content of the pressure sensitive adhesive.

62. The pressure sensitive adhesive composition of claim 60 wherein the amount of polysiloxane present is in the range from about 0.1 to 1.0 percent based on the solids content of the pressure sensitive adhesive.

63. The pressure sensitive adhesive composition of claim 60 wherein $R_1$ is phenyl, and $R_2$, and $R_3$, and $R_4$ are methyl.

64. The pressure sensitive adhesive composition of claim 63 wherein the prime mole percent of structure (I) is from about 0.5 to 30 and the prime mole percent of structure (II) is from about 99.5 to 70.

65. The pressure sensitive adhesive composition of claim 64 wherein the prime mole percent of structure (I) is about 4.5 and the prime mole percent of structure (II) is about 95.5.

66. The pressure sensitive adhesive composition of claim 63 wherein the molecular weight of the polysiloxane is from about 35,000 to 250,000.

67. The pressure sensitive adhesive composition of claim 60 wherein $R_1$ is phenyl, $R_2$ is phenyl, and $R_3$ and $R_4$ are methyl.

68. The pressure sensitive adhesive composition of claim 60 wherein $R_1$ is methyl, the prime mole percents of structures (I) and (II) are equal and the viscosity of the polysiloxane is in the range from about $60 \times 10^3$ to $20 \times 10^6$ cps.

69. The pressure sensitive adhesive composition of claim 60, wherein $R_1$ is and $R_7$ and $R_8$ are hydrogen, the prime mole percent of structure (I) is from about 40.0 to 60.0 and the prime mole percent of structure (II) is from about 60.0 to 40.0, and the polysiloxane possesses a molecular weight from about $5 \times 10^5$ to $1 \times 10^6$.

70. The pressure sensitive adhesive composition of claim 60 wherein $R_1$ is polyoxyalkylene and the oxyalkylene unit possesses a molecular weight of at least about 1500, wherein $R_6$ is a monovalent hydrocarbon group having from 1 to 10 carbon atoms, and contains both oxyethylene and oxypropylene units.

71. The pressure sensitive adhesive composition of claim 70 wherein the oxyalkylene unit comprises from about 15 to 60 weight percent oxyethylene units.

72. The pressure sensitive adhesive composition of claim 71 wherein there are at least about three units having structure (I) and at least about 40 units having structure (II).

73. The pressure sensitive adhesive composition of claim 72 wherein $R_2$, $R_3$ and $R_4$ are methyl.

74. The pressure sensitive adhesive composition of claim 73 wherein the polysiloxane has a viscosity at room temperature of about 2,000 to 2,600 cps. measured with a #4 spindle at 30 rpm.

75. The pressure sensitive adhesive composition of claim 60 wherein $R_1$, $R_2$, $R_3$ and $R_4$ are methyl and the terminal groups of the polymer are hydroxy oxyalkylene units.

76. The pressure sensitive adhesive composition of claim 75 wherein the weight percent OH is from about 1.4 to 1.6.

77. The pressure sensitive adhesive composition of claim 76 wherein the oxyalkylene portion of the terminal group comprises oxypropylene units or oxyethylene units.

78. The pressure sensitive adhesive composition of claim 77 wherein the oxyalkylene portion has a molecular weight in the range from about 120 to 700.

79. The pressure sensitive adhesive composition of claim 60 wherein $R_1$ is polyoxyalkylene, $R_6$ is hydrogen, and the oxyalkylene unit possesses a molecular weight in the range from about 80 to 660.

80. The pressure sensitive adhesive composition of claim 79 wherein the weight percent OH is from about 0.9 to 4.5.

81. The pressure sensitive adhesive composition of claim 79 wherein the polysiloxane possesses a viscosity in the range from about 40 to 465 centistokes.

* * * * *